United States Patent
Seth et al.

(10) Patent No.: US 8,127,114 B2
(45) Date of Patent: Feb. 28, 2012

(54) SYSTEM AND METHOD FOR EXECUTING INSTRUCTIONS PRIOR TO AN EXECUTION STAGE IN A PROCESSOR

(75) Inventors: Kiran Ravi Seth, Morrisville, NC (US); James Norris Dieffenderfer, Apex, NC (US); Michael Scott McIlvaine, Raleigh, NC (US); Nathan Samuel Nunamaker, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 11/692,685

(22) Filed: Mar. 28, 2007

(65) Prior Publication Data

US 2008/0244234 A1    Oct. 2, 2008

(51) Int. Cl.
*G06F 9/30* (2006.01)
(52) U.S. Cl. .................................................. 712/214
(58) Field of Classification Search ............... 712/214
See application file for complete search history.

(56) References Cited

U.S. PATENT DOCUMENTS

| 5,802,339 | A  | * | 9/1998 | Sowadsky et al. ............ 712/217 |
| 2004/0193845 | A1 | * | 9/2004 | Thimmannagari et al. ... 712/214 |
| 2006/0095717 | A1 | * | 5/2006 | Glossner et al. .............. 712/24 |

FOREIGN PATENT DOCUMENTS

| WO | 9516955 | 6/1995 |
| WO | 2004097626 | 11/2004 |

OTHER PUBLICATIONS

Patterson, David. Hennessy, John. "Computer Architecture: A Quantitative Approach". Morgan Kaufmann Publishers, Inc. Second Edition, 1996. pp. 251-261.*
International Preliminary Report on Patentability—PCT/US07/060645, The International Bureau of WIPO, Geneva Switzerland—Jul. 22, 2008.
International Search Report—PCT/US07/060645, International Search Authority—European Patent Office—Jul. 11, 2007.
Written Opinion—PCT/US07/060645, International Search Authority—European Patent Office—Jul. 11, 2007.
International Search Report—PCT/US08/058246, International Search Authority—European Patent Office—Jul. 25, 2008.
Written Opinion—PCT/US08/058246, International Search Authority—European Patent Office—Jul. 25, 2008.

* cited by examiner

*Primary Examiner* — Robert Fennema
(74) *Attorney, Agent, or Firm* — Peter M. Kamarchik; Nicholas J. Pauley; Jonathan T. Velasco

(57) ABSTRACT

A method of processing a plurality of instructions in multiple pipeline stages within a pipeline processor is disclosed. The method partially or wholly executes a stalled instruction in a pipeline stage that has a function other than instruction execution prior to the execution stage within the processor. Partially or wholly executing the instruction prior to the execution stage in the pipeline speeds up the execution of the instruction and allows the processor to more effectively utilize its resources, thus increasing the processor's efficiency.

16 Claims, 6 Drawing Sheets

| INSTRUCTION: | OPERATION |
|---|---|
| A: | ADD $R_1$, $R_4$, $R_3$ |
| B: | 303—{ADD $R_4$, $R_1$,} {$R_5$, LSL #2}—302 |
| C: | 305—{ADD $R_6$, $R_1$,} {$R_5$, LSL $R_7$}—304 |
| D: | 307—{SUB $R_8$, $R_4$,} {$R_7$, LSL #2}—306 |
| E: | AND $R_1$, $R_2$, $R_5$ |
| F: | ORR $R_7$, $R_2$, $R_3$ |

FIG. 3

| INSTRUCTION: | OPERATION |
|---|---|
| A1: | ADD $R_1$, $R_4$, $R_3$ |
| B1: | 503 ⌇ [ ADD $R_6$, $R_1$, ] [ $R_5$, LSL #2 ] ⌇ 502 |
| C1: | 505 ⌇ [ ADD $R_4$, $R_1$, ] [ $R_5$, LSL $R_7$ ] ⌇ 504 |
| D1: | MUL $R_1$, $R_2$, $R_3$ |
| E1: | LSL $R_3$, $R_2$ #2 |
| F1: | AND $R_8$, $R_4$, $R_3$ |

FIG. 5

SYSTEM AND METHOD FOR EXECUTING INSTRUCTIONS PRIOR TO AN EXECUTION STAGE IN A PROCESSOR

FIELD OF DISCLOSURE

The present invention relates generally to computer systems, and more particularly to a method and a system for executing instructions prior to an execution stage in a processor.

BACKGROUND

A processor pipeline is composed of many stages where each stage performs a function associated with processing and executing an instruction. Each stage is referred to as a pipe stage or pipe segment. The stages are connected together to form the pipeline. Instructions enter at one end of the pipeline and exit at the other end. The instructions flow sequentially in a stream through the pipeline stages. The stages are arranged so that several stages can be simultaneously processing several instructions. Simultaneously processing multiple instructions at different pipeline stages allows the processor to process instructions faster than processing only one instruction at a time, thus improving the execution speed of the processor.

The processing of instructions begins with fetching the instructions during a first pipeline stage. The instructions are then passed on to and processed by subsequent stages within the processor. As the instructions are processed in each stage, various functions may be performed on the instructions. Exemplary processing of instructions may include fetching the instructions, decoding the instructions, identifying the instructions, executing the instructions, recording the results, and the like.

While processing the instructions, the processor may experience a delay in executing an instruction. These delays may be caused by hazards encountered by the processor. As those skilled in the art appreciate, there are three types of hazards that may be encountered within a pipeline processor, resource hazards (also referred to as a structural hazard), data hazards and control hazards. All three hazards delay instructions from executing. Resource hazards exist when the hardware needed by the instruction is not available. Typically this occurs when multiple instructions require the use of the same resources. Data hazards arise when information relating to the instructions is gathered or identified. Data hazards include, read after write (RAW), write after write (WAW) and write after read (WAR) hazards. Control hazards arise when certain instructions change the program counter.

In some processors, delayed instructions may be held in a holding stage when the hazard is encountered. For example, an instruction may be held in the holding stage while information relating to the delayed instruction is gathered or identified. Sometime after the information becomes available, the instruction is released from the holding stage and the instruction is passed to subsequent stages. In one of the latter stages within the pipeline, the instructions are ultimately processed by an execution stage. After the instruction is executed during the execution stage, the results of the instruction execution are gathered by the processor and stored.

Commonly in some processors, when an instruction experiences a delay due to a pipeline hazard, the instruction is delayed from reaching the execution stage, thus the execution of the instruction is delayed. As is the case with a resource hazard, even though some or all of the information necessary to execute the instruction may be available, the processor may not have resources available to execute the instruction. Delaying the execution of the instructions prior to the execution stage may impact and diminish the overall processing efficiency of the processor.

SUMMARY OF THE DISCLOSURE

Accordingly, there exists a need in the industry to have a processor that can partially or wholly execute a stalled instruction in a pipeline stage that has a function other than instruction execution prior to the execution stage within the processor. Partially or wholly executing the instruction prior to the execution stage in the pipeline speeds up the execution of the instruction and allows the processor to more effectively utilize its resources, thus increasing the processor's efficiency. The present disclosure recognizes this need and discloses such a processor.

A method of partially executing a stalled instruction in a pipeline stage that has a primary function other than instruction execution is disclosed. The method loads a first instruction into a holding stage. The method stalls the first instruction if a pipeline hazard is encountered and partially executes the first instruction. The method further loads the first instruction into an execution stage and completes the execution of the first instruction in the execution stage.

In an alternative embodiment, a method of wholly executing a stalled instruction in a pipeline stage that has a primary function other than instruction execution is disclosed. The method loads a first instruction into a holding stage. The method stalls the first instruction if a pipeline hazard is encountered and wholly executes the first instruction. The method further writes the results of the execution of the first instruction.

A pipeline processor is disclosed. The pipeline processor has a holding stage configured to accept a first instruction, the holding stage coupled to an execution stage. The holding stage is configured to stall the first instruction when a pipeline hazard is encountered, the holding stage further comprising an execution logic circuit, the execution logic circuit configured to partially execute or wholly execute the first instruction, and the execution stage further comprising execution units, the execution units configured to execute the partially executed first instruction.

A more complete understanding of the present invention, as well as further features and advantages of the invention, will be apparent from the following detailed description and the accompanying drawings.

BRIEF DESCRIPTION OF THE DRAWINGS

FIG. 3 shows an exemplary group of instructions executed by the processor of FIG. 1.

FIG. 5 shows another exemplary group of instructions executed by the processor of FIG. 1.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Figure 1:
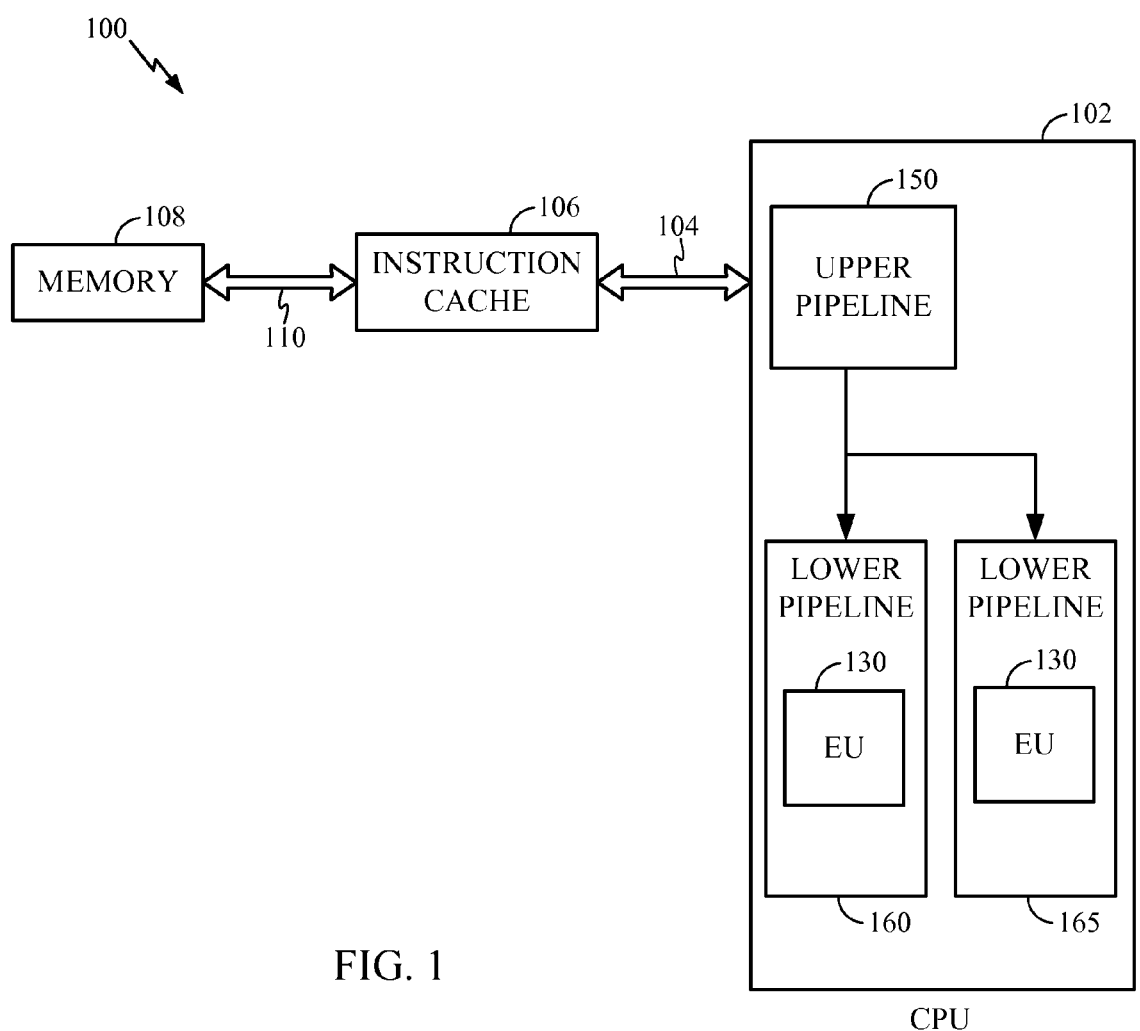
FIG. 1 shows a high level logic hardware block diagram of a processor using an embodiment of the present invention.

FIG. 1 shows a high level view of a superscalar processor 100 utilizing an embodiment as hereinafter described. The processor 100 has a central processing unit (CPU) 102 that is coupled via a dedicated high speed bus 104 to an instruction cache 106. The instruction cache 106 is also coupled via a general purpose bus 110 to memory 108. The CPU 102 has an upper pipeline 150 coupled to lower pipelines 160 and 165. The CPU 102 controls the loading of instructions from memory 114 into the instruction cache 106. Once the instruction cache 106 is loaded with instructions, the CPU 102 is able to access them via the high speed bus 104. Instructions are fetched from the instruction cache 106 into the upper pipeline 150. After the instructions are processed in the upper pipeline 150 they are sent to the lower pipelines 160 or 165 for further processing.

Instructions enter the upper pipeline in sequential order and may be rearranged in the lower pipelines 160 or 165 for more efficient processing. The rearrangement of instructions in the lower pipelines 160 and 165 are described in greater detail in the discussions of FIGS. 2-6. Some exemplary processing functions performed on the instructions in the upper pipeline 150 include fetching the instruction, aligning the instruction, decoding the instruction, and the like. Within the lower pipelines 160 and 165 instruction processing may include, tracking the instruction, executing the instruction, recording the instruction results and the like.

Lower pipelines 160 and 165 may contain various execution units (EU) 130 such as arithmetic logic units, floating point units, store units, load units and the like. For example, an EU 130 having arithmetic logic units may execute a wide range of arithmetic functions, such as integer addition, subtraction, simple multiplication, bitwise logic operations (e.g. AND, NOT, OR, XOR), bit shifting and the like. Alternatively, the EU 130 may have load units or store units that perform load, read or write functions. In order to increase the efficiency of the processor 100, the lower pipelines 160 and 165 may be organized to perform certain functions. For example, the lower pipeline 160 may contain EUs 130 that perform arithmetic functions, while lower pipeline 165 may contain EUs 130 that perform load/store functions. By segregating certain functionality into separate lower pipelines 160 or 165, duplicate EUs 130 may not be required. In an alternative embodiment, the lower pipelines 160 and 165 may contain similar EUs 130 allowing the processor to perform similar processing functions on multiple instructions in each lower pipeline 160 and 165 during the same processor cycle. In yet another embodiment, there may be only one lower pipeline processing instructions. The inventive concepts as presented herein may be applied to a processor with one or more lower pipelines.

As those skilled in the art may appreciate, a pipeline stage may consist of a register or group of registers designed to hold an instruction. When an instruction enters a particular stage, the processor loads the instruction into the register or group of registers linked to that stage. Associated with each stage may be logic circuitry which may perform certain operations, depending on the instruction. After the logic circuitry has performed its intended operation, the instruction is then passed on to the next sequential stage.

Figure 2:
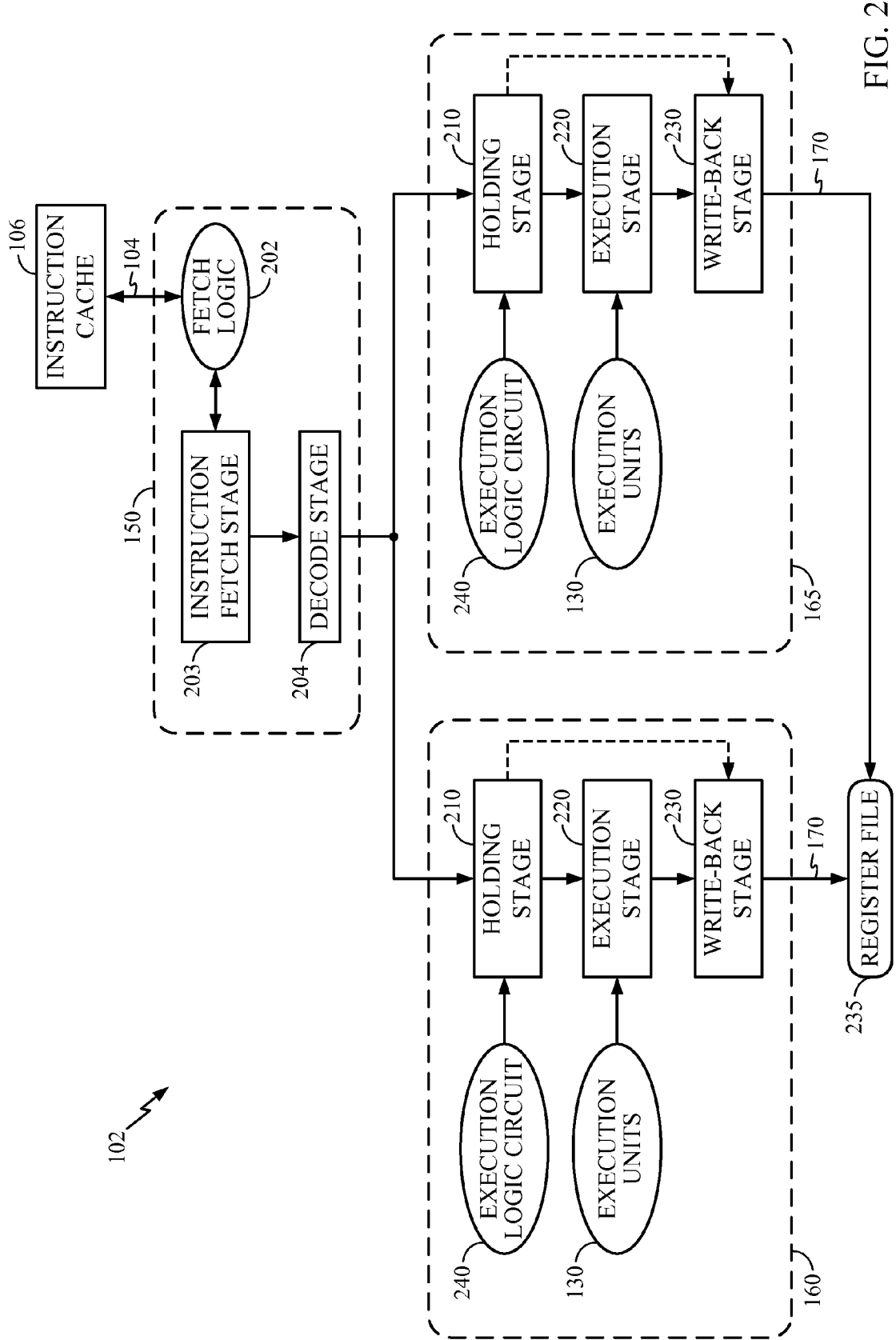
FIG. 2 displays a more detailed block diagram of the CPU within the processor of FIG. 1.

FIG. 2 displays a more detailed block diagram of the CPU 102. The upper pipeline 150 has fetch logic circuit 202 coupled to a fetch stage 203 which is coupled to a decode stage 204. Within the lower pipeline 160 or 165 is a holding stage 210, coupled to an execution stage 220, which is coupled to a write-back stage 230. The holding stage 210 may also be coupled directly to the write back stage 230. The write back stages 230 of lower pipelines 160 and 165 are coupled to a register file 235 by bus 170. The holding stage 210 is coupled to an execution logic circuit 240 and EUs 130 are coupled to the execution stage 220.

Instructions flow from the top of the upper pipeline 150 through the lower pipelines 160 and 165. Within the upper pipeline 150, the fetch stage 203 uses the fetch logic 202 to determine and subsequently fetch instructions from the instruction cache 106. In the instruction cache 106, instructions are grouped into sections known as cache lines. Each cache line may contain multiple instructions. As a result, instructions may be fetched and decoded from the instruction cache 106 several instructions at a time. After the instructions are fetched by the fetch logic 202, the instructions are sent to the decode stage 204.

In the decode stage 204, the instructions are decoded to determine the identity of the instruction as well as any possible instruction dependencies (i.e. data hazards). Information retrieved or identified during the decode stage 204 by decode logic circuitry (decode logic circuitry not shown for ease of illustration) allows the processor 100 to determine which of the lower pipelines 160 or 165 will receive the instruction for further processing. As mentioned previously, the lower pipeline 160 may be designed to handle arithmetic functions while lower pipeline 165 may be designed to handle load/store functions. In the embodiment of FIG. 2, the lower pipelines 160 and 165 contain similar operational blocks even though the instructions that they process may be functionally different.

In an illustrative example, an instruction may be identified as a multiply instruction, multiplying the contents of two registers together and storing the results in a third register. The identification process may occur during the decode stage 204. Also during the decode stage 204, possible data hazards related to the multiply instruction may also be identified. In this example, the multiply instruction may be sent to the lower pipeline 160 with the processor 100 identifying that one or both of the instruction's operands may not be available (i.e. the contents of the two registers may not yet be determined).

Once an instruction passes through the decode stage 204 and on to either of the lower pipelines 160 or 165, the processor 100 continues to monitor the processing of the instruction until the instruction completes its execution and the results are written. As instructions finish executing, the results are transmitted on the bus 170 and the processor 100 may use that information to expedite the execution of subsequent instructions.

One technique the processor may use to monitor instructions is referred to as "scoreboarding" the instructions. Those skilled in the art appreciate that tracking instructions using an instruction scoreboard allows the processor to track the instruction progress as well as any instruction dependencies. After the instructions are identified in the decode stage 204, an entry for the instruction is created in the instruction scoreboard. The entry may include an entry number or other instruction identifier, the instruction function (i.e. multiply, add, load, store and the like), the stage in the lower pipeline that the instruction is currently located, and any dependency the instruction may have. Once the instruction finishes execution in the lower pipeline 160 or 165, the instruction entry is removed.

As instructions enter the lower pipelines 160 or 165, they are first processed in the holding stage 210. The instructions may be held in the holding stage 210 for one or more processor cycles, in order to wait for one or more hazards to resolve. In one exemplary embodiment the holding stage may be a reservation stage. In an alternative embodiment the holding stage may be an instruction queue. Those skilled in the art appreciate that instructions processed through a reservation stage may be reordered, thus allowing younger instructions to bypass older instructions when the older instructions encounter a data hazard. In contrast, an instruction queue may not allow reordering of instructions. The instruction queue processes instructions on a first in first out basis. Thus if the oldest instruction in the instruction queue experiences a delay due to a data hazard, subsequent younger instructions will also encounter a delay and remain in the instruction queue until the oldest instruction leaves. With either the reservation stage or instruction queue, the main purpose of the holding stage 210 is to provide the processor 100 with a temporary holding location for the instructions when a hazard is encountered.

An instruction waiting to resolve a hazard may also be referred to as a stalled instruction. Temporarily holding a stalled instruction in the reservation stage allows subsequent instructions to bypass the stalled instruction and continue moving through the lower pipelines 160 and 165. Bypassing stalled instructions allows the processor to use its processing resources more efficiently. Without a reservation stage, the instruction flow through the lower pipeline 160 or 165 may be blocked until the pipeline hazard is resolved.

In one embodiment, the holding stage 210 may be a reservation stage having a register capable of holding a single instruction. In yet another embodiment, the reservation stage may be a set of registers capable of holding a plurality of instructions. When determining how many instructions may be held in the reservation stage, the number of instructions held must be balanced with the amount of additional hardware required, as well as any possible performance degradation experienced by the processor 100.

The processor 100 continues to monitor a stalled instruction while it is in the holding stage 210. Once the processor has determined that the pipeline hazard associated with the stalled instruction has been resolved, the processor 100 releases the instruction back into the processing stream of the lower pipeline 160 or 165. If the instruction has all of its data hazards resolved (i.e. the instruction has all of its operands), the instruction is passed from the holding stage 210 to the execution stage 220. Within the execution stage 220, the instruction is executed by the EUs 130. After the instruction is executed, the results are written to the register file 235 when the instruction is in the write back stage 230 by write back logic circuitry (not shown for ease of illustration).

While the instruction or instructions are held in the holding stage 210 in lower pipelines 160 or 165, the execution logic circuit 240 may execute some or all of the instructions. In one embodiment, the execution logic circuit 240 contains a subset of the logic circuitry present in the EUs 130. An instruction with an executable function that may be performed by the execution logic circuit 240 may be wholly or partially executed by the execution logic circuit 240 prior to reaching the execution stage 220. The results from the partial execution of the instruction in the holding stage 210 may be saved by the processor 100 and passed on to the execution stage 220. When an instruction is wholly or completely executed in the holding stage 210, the results from the instruction execution may be written directly to the register file 235 by the write back stage 230. This process is described in more detail in the subsequent discussions of FIGS. 3-6.

In an exemplary embodiment, the execution logic circuit 240 may contain logic circuitry that executes a logical shift left (LSL) operation. In this embodiment the execution logic circuit 240 contains a copy of logic circuitry which also exists within the EUs 130 in lower pipelines 160 or 165. By having logic circuitry to perform LSL operations in both the execution logic circuit 240 as well as the EU 130, the processor 100 may execute instructions with an LSL operation in either the holding stage 210 or the execution stage 220, thus increasing the processing efficiency of the processor 100.

When deciding what functionality to support in the execution logic circuit 240, the additional space required, the power and heat dissipation, the amount of execution time, and the frequency of the particular instructions may be taken into account. In the previously described embodiment, the LSL instruction may be executed often enough that the number of processor cycles saved by executing the LSL instruction prior to the execution stage 220 outweighs any performance impact that may be experienced by the processor 100. In alternative embodiments, other functions such as addition, subtraction, logical operations or the like may be implemented in the execution logic circuit 240.

Figure 4:
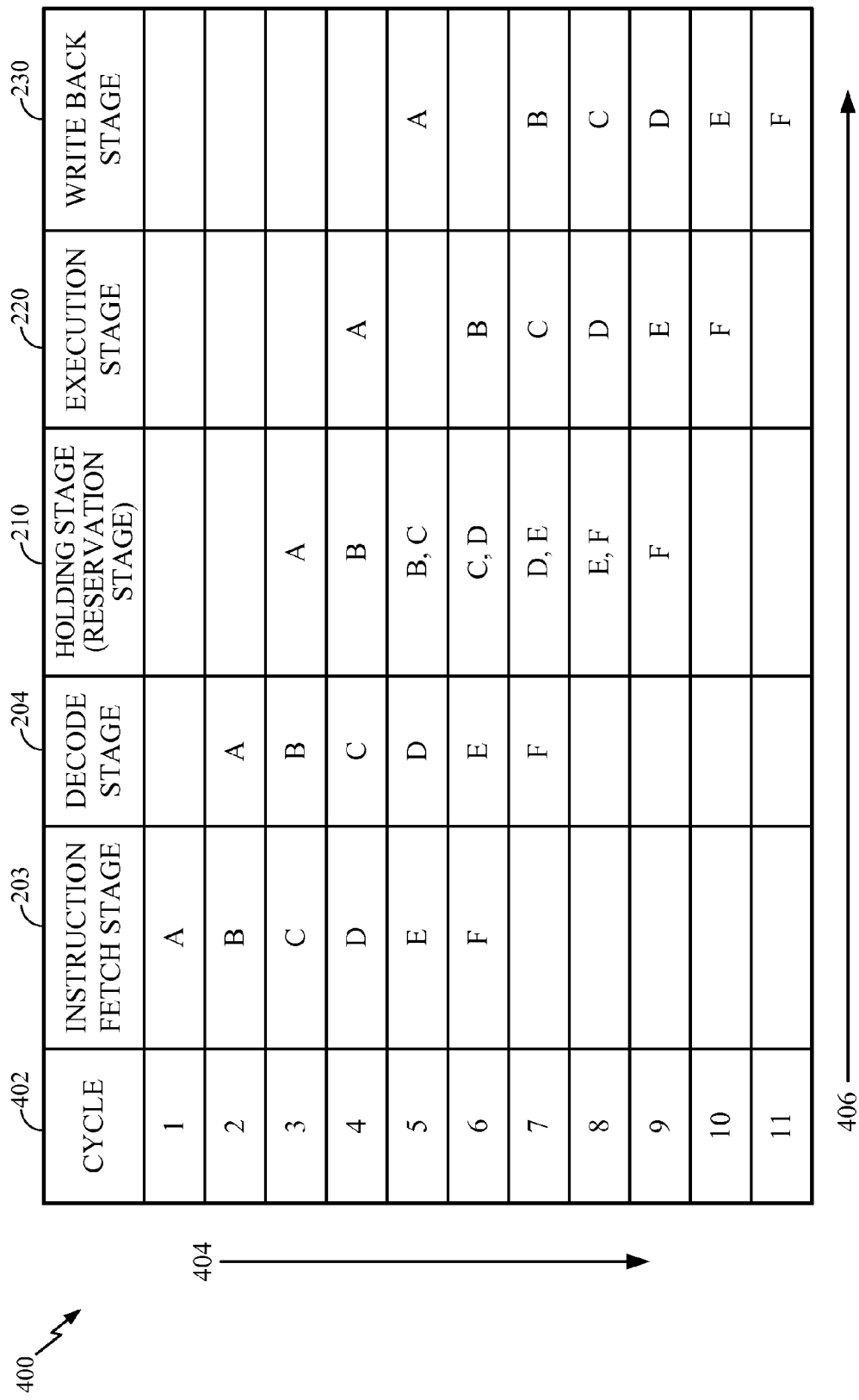
FIG. 4 shows a timing diagram of the exemplary group of instructions of FIG. 3 as they are executed through various stages of the processor of FIG. 1.

FIG. 3 displays an exemplary group of instructions 300 processed by the processor 100 utilizing one embodiment of the present invention. For the purposes of this example, execution logic circuit 240 contains a logical shift left (LSL) circuit. FIG. 4 displays a timing diagram 400 showing the group of instructions 300 as they are processed through the stages of the upper pipeline 150 and lower pipeline 165. The timing diagram 400 displays the processor cycle 402 along the Y-Axis 404 and the stage (203, 204, 210, 220 and 230) of the processor 100 along the X-Axis 406. Although the timing diagram 400 shows the group of instructions 300 flowing through lower pipeline 160 the group of instructions 300 could flow through the lower pipeline 165. In addition, the holding stage 210 displayed in FIG. 4 may be either a reservation stage or an instruction queue. In describing the processing of the group of instructions 300 a reservation stage used as an example of the holding stage 210.

As displayed in FIG. 3, compound instructions B, C and D have multiple executable operations. Compound instruction B is comprised of LSL operation 302 and ADD operation 303. The LSL operation 302 of compound instruction B logically shifts left (LSL) register 5 ($R_5$) by 2. ADD operation 303 comprises the addition of $R_5$ (after being logically shifted by 2) and register 1 ($R_1$), with the result written into register 4 ($R_4$). Compound instruction C has LSL operation 304 as well as ADD operation 305. LSL operation 304 comprises the LSL of $R_5$ by the value defined in register 7 ($R_7$) and ADD operation 305 is the addition of $R_5$ with $R_1$ with the result written into register 6 ($R_6$). Instruction D has LSL operation 306 and SUB operation 307. The LSL operation 306 of instruction D logically shifts left the contents of $R_7$ left by 2. The SUB operation 307 of instruction D subtracts the value in $R_4$ by the value in $R_7$ and stores the results in register 8 ($R_8$).

Referring to FIG. 4, instruction A is the first instruction processed by the processor 100. Instruction A is fetched into the instruction fetch stage 203 in processor cycle 1. In processor cycle 2, instruction A is sent to the decode stage 204 while compound instruction B is fetched by the fetch logic 202 and loaded into the instruction fetch stage 203. In processor cycle 3, instruction A is sent to the reservation stage of lower pipeline 160. In this embodiment, the reservation stage may hold up to two instructions. Also during processor cycle 3, compound instruction B is decoded in the decode stage 204 while compound instruction C is fetched by the instruction fetch stage 203. After instruction B is decoded, the processor 100 determines that instruction B is a compound instruction having a dependency (i.e. a data hazard) on information yet to be determined from the execution of instruction A (i.e. the value of $R_1$). Since instruction A has no dependencies, it will only remain in the reservation stage for one processor cycle (processor cycle 3).

In processor cycle 4, instruction A is executed in the execution stage 220 while compound instruction B is loaded into the reservation stage. Compound instruction B will be held in the reservation stage until the dependency of its operand is resolved (i.e. the value of $R_1$ is determined after the execution of instruction A). In this example, the value of $R_1$ is available in the next processor cycle (processor cycle 5) when the processor 100 writes the results of instruction A into the register file 235 during the write back stage 230. During processor cycle 4, compound instruction D is fetched by the instruction fetch stage 203 and compound instruction C is processed in the decode stage 204. After compound instruction C is decoded in the decode stage 204, the processor 100 identifies that compound instruction C is a compound instruction, containing a logical shift left function and having a dependency on instruction A (i.e. the value of $R_1$).

While compound instruction B is in the reservation stage during processor cycle 4, the execution logic circuit 240 may execute the LSL operation 302. Thus, compound instruction B may be partially executed by the execution logic circuit 240 while held in the reservation stage. As described previously, the execution logic circuit 240 may contain logic circuitry to perform an LSL operation (in this example a logical shift left by 2 instruction). The processor's efficiency increases by performing a required operation during a stall cycle, that otherwise performs no operations. Without the execution logic circuit 240 in the reservation stage, compound instruction B would require 2 processor cycles in the execution stage 220 to complete its execution (i.e. one cycle for performing the LSL operation 302 and one cycle for performing the ADD operation 303). In this example, the results from executing the LSL operation 302 are saved by the processor 100 and when compound instruction B is sent to the execution stage 220 (in processor cycle 6), the results are also sent. Using execution logic circuit 240 to execute the LSL operation 302 enables the processor 100 to execute the ADD operation 303 in one processor cycle when compound instruction B reaches the execution stage 220. Thus the processing time required to execute the compound instruction B in an execution stage is reduced by one processor cycle. Furthermore, this embodiment allows a portion of a compound instruction to be executed while a dependency on another portion of the compound instruction exists.

As mentioned previously, instruction A finishes execution and the results are written to the register file 235 during the write back stage 230 in processor cycle 5. The results are provided to compound instruction B while it is in the reservation stage in processor cycle 5. Compound instruction B will be released to the execution stage 220 in the next processor cycle (processor cycle 6). Compound instruction C is loaded into the reservation stage during processor cycle 5. The processor 100 determined that compound instruction C also requires the value stored in $R_1$ which is now available in processor cycle 5. Therefore, compound instruction C no longer has any data hazards based on operand availability and could be released to the execution stage 220, if the execution stage 220 is available during the next processor cycle (processor cycle 6). However, compound instruction B is released first into the execution stage 220, thus compound instruction C experiences a stall due to a resource conflict (execution stage 220 is occupied with instruction B) and remains in the reservation stage until compound instruction B is sent to the write back stage (processor cycle 7).

While compound instruction C is stalled in the reservation stage during processor cycle 5, the execution logic circuit 240 may execute the LSL function 304. The processor 100 may load the contents of $R_7$ into the execution logic circuit 240 at the beginning of processor cycle 5. During processor cycle 5, the execution logic circuit 240 may execute the LSL function 304. The results from executing LSL operation 304 are saved by the processor 100 and when compound instruction C is sent to the execution stage 220 (in processor cycle 7), the results are also sent. Without the execution logic circuit 240 in the reservation stage, compound instruction C would require 2 processor cycles in the execution stage 200 to complete its execution (i.e. one cycle for performing the LSL operation 304 and one cycle for the ADD operation 305). Using execution logic circuit 240 to execute the LSL operation 304 enables the processor 100 to execute the ADD operation 305 in one processor cycle when compound instruction C reaches the execution stage 220. Thus the processing time required to execute the compound instruction C in the execution stage 220 is reduced by one processor cycle.

In processor cycle 5, compound instruction D is processed in the decode stage 204 and instruction E is fetched by the instruction fetch stage 203. After compound instruction D is decoded, the processor 100 identifies that compound instruction D is a compound instruction having two executable operations, LSL operation 306 and SUB operation 307. The processor 100 further identifies that compound instruction D has a dependency on compound instruction B (i.e. compound instruction D needs the value of $R_4$ to be determined in order to execute). After the data hazard for compound instruction D is resolved (i.e. the results of $R_4$ are available), compound instruction D will be released and sent to the execution stage 220 for further execution.

In processor cycle 6, the resource hazard is resolved and the compound instruction C will leave the reservation stage and be sent to the execution stage 220 in processor cycle 7. Also during processor cycle 6, compound instruction D is loaded into the reservation stage, instruction E is processed in the decode stage 204, and instruction F is fetched by the instruction fetch stage 203. Compound instruction D continues to be held in the reservation stage during processor cycle 7 because the value of $R_4$ is not written until compound instruction B finishes executing and the results are written to the register file 235 during the write back stage (processor cycle 7).

However, since the processor 100 identified that compound instruction D contained an executable LSL operation, the processor 100 loads the value of $R_7$ into the execution logic circuit 240 at the beginning of processor cycle 6. During processor cycle 6, the execution logic circuit 240 executes the LSL operation 306. The results are saved and sent with compound instruction D when it is sent to the execution stage 220 in processor cycle 8. After processor cycle 7, the processor 100 releases compound instruction D from the reservation stage to the execution stage 220 because the dependency on $R_4$ has been resolved and the execution stage 220 is available. (i.e. there is no stall due to a resource hazard). In processor cycle 8, compound instruction D is executed and the results written to the register file 235 during the write back stage 230 in processor cycle 9. By executing the LSL function 306 in the reservation stage, the dependency of $R_4$ does not impact the execution of compound instruction D in the execution stage 220.

After instruction E is decoded in processor cycle 6, the processor 100 identifies that the instruction does not have any dependencies (i.e. data hazards) based on operand availability. Instruction E is sent to the reservation stage in processor cycle 7. During processor cycle 7, instruction D is leaving the reservation stage and instruction E remains in the reservation stage for an additional cycle. As discussed previously, even though instruction E may have all of its operands, it is waiting for the execution stage 220 to become available before its execution can begin. Since instruction E does not have an LSL operation, the execution logic circuit 240 (which for this example only implements an LSL operation) may not be used to execute instruction E prior to the execution stage 220.

Instruction F is fetched from the instruction cache 106 into the instruction fetch stage 203 during processor cycle 6. In processor cycle 7 instruction F is processed in the decode stage 204. Instruction F is sent to the reservation stage of lower pipe 160 for further processing during processor cycle 8. Instruction F remains in the reservation stage for two processor cycles (processor cycles 8 and 9) while the prior instructions (instructions D and E) are processed in the execution stage 220 and write back stage 230 respectively. Since instruction F is an ORR instruction and the execution logic circuit 240 contains LSL circuitry, no execution prior to the execution stage 220 for instruction F is performed. As a result, instruction F is executed in processor cycle 10 and its results are written to the register file 235 during the write back stage 230 in processor cycle 11.

If an instruction queue were used instead of the reservation stage to process the group of instructions 300 described in the previous example, the outcome would be exactly the same. The outcome is the same because the group of instructions 300 is not reordered after being processed in the reservation stage. Therefore, the group of instructions 300 is not executed out of order when the instructions are executed in the execution stage 220.

Figure 6:
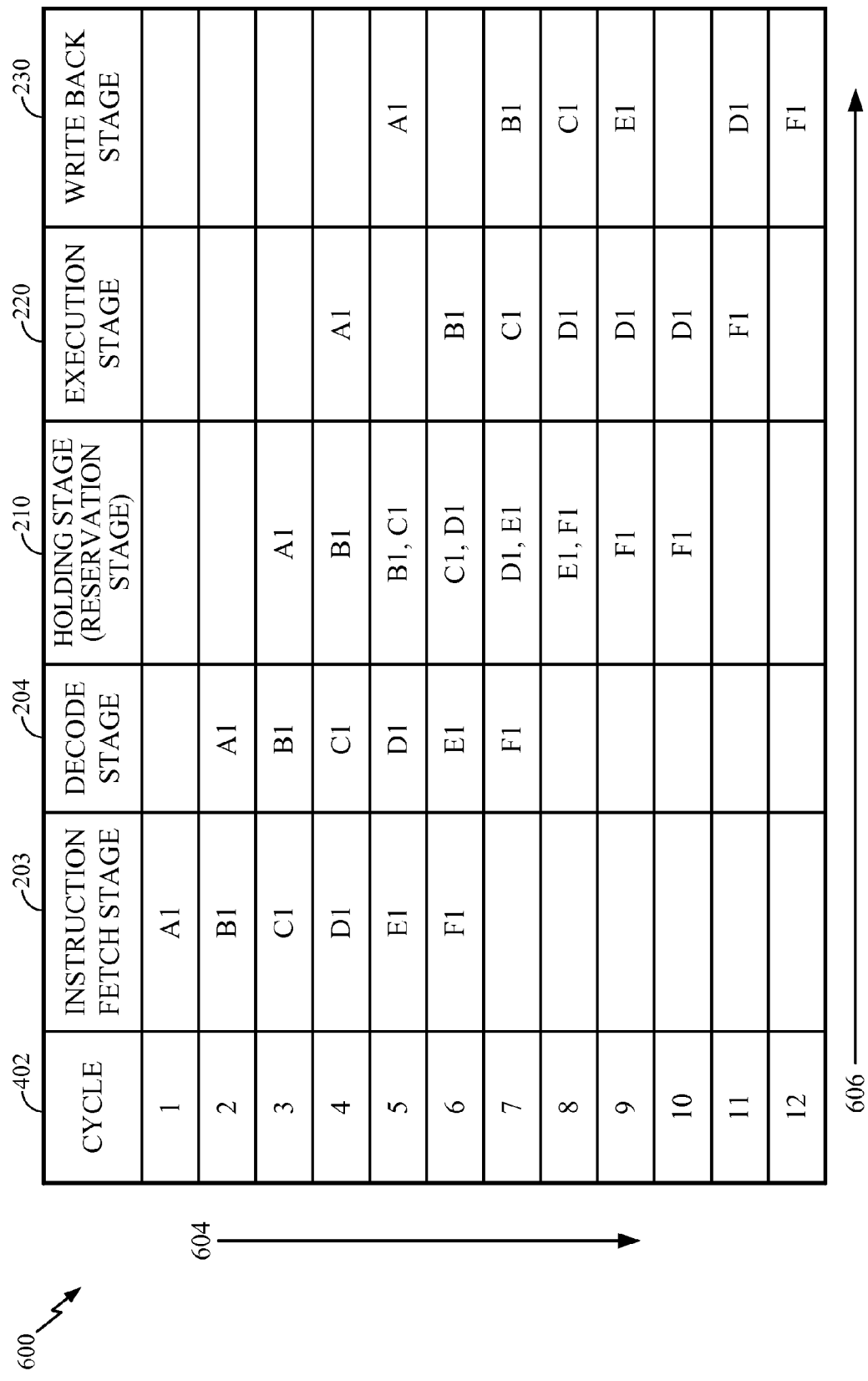
FIG. 6 shows a timing diagram of the exemplary group of instructions of FIG. 5 as they are executed through various stages of the processor of FIG. 1.

FIG. 5 displays another exemplary group of instructions 500 processed by the processor 100 utilizing an embodiment of the present invention. FIG. 6 shows a timing diagram 600 of the group of instructions 500 as they flow through the various stages of the upper pipeline 150 and lower pipeline 160 in the processor 100. The timing diagram 600 displays the processor cycle 602 along the Y-Axis 604 and the stages (203, 204, 210, 220 and 230) of the processor 100 along the X-Axis 606. Although the timing diagram 600 shows the group of instructions 500 flowing through lower pipeline 160 the group of instructions 500 could also flow through the lower pipeline 165 if lower pipeline 165 was able to process the group of instructions 500. In addition, the holding stage 210 displayed in FIG. 6 may be either a reservation stage or an instruction queue. For ease of illustration a reservation stage is used to process the group of instructions 500.

As displayed in FIG. 5, compound instructions B1 and C1 have multiple executable operations. Compound instruction B1 has LSL operation 502 and ADD operation 503. LSL operation 502 is the logical shift left (LSL) by 2 of $R_5$ and ADD operation 503 is the addition of $R_5$ (after being logically shifted left by 2) with $R_1$ and the results are stored in $R_6$. Compound instruction C1 has LSL operation 504 and ADD operation 505. The LSL function 504 logically shifts left $R_5$ by the value defined in $R_7$ and the ADD function 505 is the addition of $R_5$ (after being logically shifted left by the value of $R_7$) with $R_1$ and the results are stored in $R_4$.

Referring to the timing diagram 600, instruction A1 is fetched from the instruction cache 106 by the instruction fetch stage 203 using fetch logic circuit during processor cycle 1. In processor cycle 2, instruction A1 is sent to the decode stage 204 for processing while compound instruction B1 is fetched by the instruction fetch stage 203. After instruction A1 is decoded, the processor 100 identifies that instruction A1 does not have any dependencies and will not be held in the reservation stage for dependency resolution based upon operand availability.

In processor cycle 3, instruction A1 is sent to the reservation stage of lower pipeline 160. Since instruction A1 has no dependencies (i.e. its operands are identified and there are not resource conflicts) it will remain in the reservation stage for only one processor cycle (processor cycle 3) before being sent to the execution stage 220 in processor cycle 4. During processor cycle 3, compound instruction B1 is decoded in the decode stage 204 while compound instruction C1 is fetched by the instruction fetch stage 203. After instruction B1 is decoded during the decode stage 204, the processor 100 identifies that compound instruction B1 is a compound instruction having two executable operations (502 and 503), one of which is a logical shift left by 2 (LSL function 502). Additionally, the processor 100 identifies that compound instruction B1 has a dependency on instruction A1 (i.e. the value of $R_1$ is needed to complete the execution of compound instruction B1).

In processor cycle 4, instruction A1 is executed in the execution stage 220 while compound instruction B1 enters the reservation stage. Compound instruction B1 encounters a stall based on operand availability (i.e. data hazard) and will be held in the reservation stage until the value of $R_1$ is available. In this example, the value of $R_1$ is not available until after instruction A1 has finished executing and the results are written to the register file 235 during the write back stage 230 in processor cycle 5. While compound instruction B1 is in the reservation stage, compound instruction B1 maybe partially executed; the LSL function 502 may be executed by the execution logic circuit 240 during processor cycle 4. The results from executing LSL operation 502 are saved by the processor 100 and when compound instruction B1 is sent to the execution stage 220 (in processor cycle 6), the results are also sent. The remaining ADD function 503 of compound instruction B1 will be executed during the execution stage 220.

During processor cycle 4, instruction D1 is fetched by the instruction fetch stage 203 and compound instruction C1 is processed in the decode stage 204. After compound instruction C1 is decoded during the decode stage 204 in processor cycle 4, the processor 100 identifies that compound instruction C1 is a compound instruction containing two executable operations, LSL operation 504 and ADD operation 505. The processor 100 also identifies that ADD operation 505 of compound instruction C1 has a dependency on the value $R_1$ which must be resolved before compound instruction C1 can leave the reservation stage.

Instruction A1 finishes execution and the results are written to the register file 235 while Instruction A1 is in the write back stage 230 in processor cycle 5. The results of instruction A1 are sent to compound instruction B1 while it is held in the reservation stage. After compound instruction B1 has received the results, it will be released to the execution stage 220 in the next processor cycle (processor cycle 6). Compound instruction C1 continues to be processed in the reservation stage during processor cycle 5. The processor 100 determines that the dependency for compound instruction C1 has been resolved in processor cycle 5 since the value of $R_1$ is now available. However, compound instruction C1 will not be released to the execution stage 220 in processor cycle 6 due to the resource hazard that arises because compound instruction B1 will be released first. During processor cycle 5, compound instruction C1 may be partially executed; the LSL operation 504 of compound instruction C1 is executed by the execution logic circuit 240. The results from executing LSL operation 504 are saved by the processor 100 and when compound instruction C1 is sent to the execution stage 220 (in processor cycle 7), the results are also sent. The other ADD operation 505 of compound instruction C1 will be executed in the execution stage 220 during the next processor cycle (processor cycle 7) because the execution logic circuit 240 does not contain the logic circuitry necessary to execute the ADD function.

In processor cycle 5, instruction D1 is processed in the decode stage 204 and instruction E1 is fetched by the instruction fetch stage 203. After instruction D1 is decoded, the processor 100 identifies that instruction D1 has no dependencies and contains no LSL operations. Therefore, instruction D1 will not be held in the reservation stage because of an operand dependency (i.e. data hazard).

In Processor cycle 6, compound instruction B1 is executed in the execution stage 220. Utilizing one aspect of the present invention, the processor completes the execution of compound instruction B1 in one processor cycle due to the prior execution of LSL operation 502 by the execution logic circuit 240 in processor cycle 4. Using the execution logic circuit 240 to execute the LSL operation 502 reduced the processing time for compound instruction B1 to execute in the execution stage 220 by one processor cycle. Furthermore, this embodiment allows a portion of a compound instruction to be executed while a dependency on another portion of the compound instruction exists.

Since compound instruction C1 can not proceed to the execution stage 220 during processor cycle 6, (i.e. because compound instruction B1 is currently in the execution stage 220 in processor cycle 6). Also in processor cycle 6, instruction D1 is sent to the reservation stage. Even though instruction D1 does not have a dependency based on operand availability, instruction D1 encounters a resource hazard (compound instruction C1 is using the execution stage 220 in processor cycle 7) and will not be released to the execution stage 220 until processor cycle 8. Instruction D1 does not have an LSL operation and therefore the execution logic circuit 240 may not execute instruction D1 partially or wholly prior to the execution stage 220.

Instruction E1 is processed in the decode stage 204 and instruction F1 is fetched by the fetch stage 203 during processor cycle 6. Instruction E1 has one executable LSL operation which logically shifts left the contents of $R_2$ by 2 and the results are stored in $R_3$. Since instruction E1 has only LSL operations, instruction E1 may be wholly or completely executed in the reservation stage by the execution logic circuit 240. As displayed in the timing diagram 400, instruction E1 experiences a resource hazard while in the reservation stage.

In an alternate embodiment of the present invention, the processor 100 may purposely stall instruction E1 in the reservation stage to allow it be completely executed by the execution logic circuitry 240. In this instance, the processor 100 may determine that by purposely delaying the LSL instruction, the processor 100 may free up the execution stage 220 for another instruction, thus increasing its processing efficiency.

During processor cycle 7 the results of executing compound instruction B1 are written to the register file 235 during the write back stage 230. As compound instruction B1 leaves the execution stage 220, compound instruction C1 enters the execution stage 220. Instruction D1 cannot enter the execution stage 220 because compound instruction C1 is currently there. As a result, instruction D1 continues to wait in the reservation stage in processor cycle 7 due to the resource conflict. Instruction E1 joins instruction D1 in the reservation stage and instruction F1 is processed in the decode stage 204 during processor cycle 7. While instruction E1 is in the reservation stage 220, the processor 100 uses the execution logic circuit 240 to execute the LSL operation 507 during processor cycle 7.

During processor cycle 8, the results of executing compound instruction C1 are written to the register file 235 in the write back stage 230. Instruction D1 enters the execution stage 220 and instruction F1 enters the reservation stage. During processor cycle 8, instruction E1 is wholly executed by the execution logic circuit 240. Since the execution logic circuit 240 has wholly executed instruction E1, the results may be written into the register file 235 without entering the execution stage 220. In this instance, the results of the execution of instruction E1 are written to the register file 235 by the write back stage 230 during processor cycle 9. Alternatively, if the processor does not have a bypass mechanism that allows the writing of the register file 235 directly from the reservation stage, the instruction may be loaded into the execution stage 220. Since the instruction has all ready completed its execution, the instruction is sent to the write back stage where the results may be written to the register file 235.

In this illustrative example instruction E1 completes its execution and its results are written back before instruction D1 has finished executing. The results are written by the reservation stage directly into the write back stage 230, which in turn writes the results to the register file 235. Utilizing execution logic circuit 240 to execute instruction E1 instead of executing it in the execution stage 220 saves processing time. The results of instruction E1 are available after processor cycle 8 and may be sent back to any subsequent instruction needing this information in order to execute. Utilizing known techniques to process the exemplary group of instructions 500, (which do not include the execution of instructions while they are in the reservation stage), the results from instruction E1 would not be available until 4 processor cycles after instruction D1 enters the execution stage 220. Three processor cycles are required to execute instruction D1 and two more processor cycles are required to execute compound instruction E1.

Referring back to the timing diagram 600 of FIG. 6, instruction D1 continues executing in processor cycle 9 and finishes executing in processor cycle 10. The results of instruction D1 are written to the register file 235 during the write back stage 230 during processor cycle 11. Also in processor cycle 11, instruction F1 enters the execution stage, and the results for instruction F1 are written to the register file 235 during the write back stage 230 in processor cycle 12.

As explained previously, the concepts as described with the various embodiments may be implemented in a single pipelined processor. Alternatively, these concepts may be applied to a processor that has two or more lower pipelines. The execution logic circuit 240 in the processor 100 may interface with any stage in a pipeline that processes instructions after a decode stage 204 and prior to an execution stage 220. As mentioned previously, the processor 100 may purposely stall an instruction capable of being partially or wholly executed in the holding stage 210 if the processor 100 predicts that a subsequent pipeline hazard may be encountered. Delaying the instruction within the holding stage 210 allows the execution logic circuitry 240 to partially or wholly execute the instruction, thus freeing up the processing resources for subsequent instructions.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method comprising:
loading a compound instruction into a holding stage of a pipeline, the holding stage prior to an execution stage of the pipeline;
stalling the compound instruction in the holding stage in response to the compound instruction encountering a pipeline hazard;
executing the compound instruction by an execution logic circuit to generate results while the compound instruction is stalled in the holding stage; and
after executing the compound instruction, holding the compound instruction in the holding stage until the pipeline hazard is removed.

2. The method of claim 1, wherein the pipeline hazard is a resource hazard.

3. The method of claim 1, wherein the pipeline hazard is a data hazard.

4. The method of claim 1, wherein the compound instruction comprises a first executable operation and a second executable operation.

5. The method of claim 1, wherein the holding stage comprises a reservation stage that is adapted to reorder execution of instructions including the compound instruction.

6. The method of claim 4, wherein execution of the second executable operation is dependent on results of the first executable operation.

7. The method of claim 1, wherein the execution logic circuit executes the compound instruction by performing a shift operation on the compound instruction.

8. The method of claim 1, further comprising writing the results to a register file during a write-back stage.

9. A pipeline processor comprising:
a holding stage, prior to an execution stage of the pipeline, the holding stage configured to:
receive a compound instruction, wherein the compound instruction comprises a first executable operation and a second executable operation, and wherein execution of the second executable operation is dependent on results of the first executable operation;
stall the compound instruction in response to encountering a pipeline hazard;
execute the first executable operation by an execution logic circuit while the compound instruction is stalled in the holding stage; and
hold the compound instruction until the pipeline hazard is removed after executing the first executable operation.

10. The pipeline processor of claim 9, wherein the pipeline hazard is a resource hazard.

11. The pipeline processor of claim 9, wherein the pipeline hazard is a data hazard.

12. The pipeline processor of claim 9, the execution stage configured to:
receive the second executable operation and the results of the first executable operation; and
execute the second executable operation based on the results of the first executable operation.

13. The pipeline processor of claim 12, further comprising a write-back stage, wherein the results of the first executable operation and results of the second executable operation are written to a register file.

14. The pipeline processor of claim 9, wherein the holding stage is a reservation stage that is adapted to reorder execution of instructions including the compound instruction.

15. A non-transitory computer-readable medium comprising operational instructions that when executed by a processor, cause the processor to:
load a compound instruction into a holding stage of a pipeline, the holding stage prior to an execution stage of the pipeline;
stall the compound instruction in the holding stage in response to the compound instruction encountering a pipeline hazard;
execute the compound instruction by an execution logic circuit to generate results while the compound instruction is stalled in the holding stage; and
after executing the compound instruction, hold the compound instruction in the holding stage until the pipeline hazard is removed.

16. A pipeline processor comprising:
means for receiving a compound instruction in a holding stage, the holding stage prior to an execution stage of the pipeline, wherein the compound instruction comprises a first executable operation and a second executable operation, and wherein execution of the second executable operation is dependent on results of the first executable operation;
means for stalling the compound instruction in the holding stage in response to encountering a pipeline hazard;
means for executing the first executable operation in the holding stage by an execution logic circuit while the compound instruction is stalled in the holding stage; and
means for holding the compound instruction in the holding stage until the pipeline hazard is removed after executing the first executable operation.

* * * * *